(12) United States Patent
Bae et al.

(10) Patent No.: US 11,579,484 B2
(45) Date of Patent: Feb. 14, 2023

(54) VIEWING ANGLE COMPENSATION FILM, POLARIZING PLATE INCLUDING SAME, AND DISPLAY DEVICE INCLUDING SAME

(71) Applicant: LG Chem, Ltd., Seoul (KR)

(72) Inventors: Sunghak Bae, Daejeon (KR); Sangcholl Han, Daejeon (KR); Byung Mook Kim, Daejeon (KR); Dae Hee Lee, Daejeon (KR); Youngjin Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/268,319

(22) PCT Filed: Jan. 21, 2020

(86) PCT No.: PCT/KR2020/001015
§ 371 (c)(1),
(2) Date: Feb. 12, 2021

(87) PCT Pub. No.: WO2020/159138
PCT Pub. Date: Aug. 6, 2020

(65) Prior Publication Data
US 2021/0333627 A1    Oct. 28, 2021

(30) Foreign Application Priority Data

Jan. 29, 2019 (KR) .......... 10-2019-0011188
Jan. 20, 2020 (KR) .......... 10-2020-0007106

(51) Int. Cl.
*G02F 1/1335* (2006.01)

(52) U.S. Cl.
CPC .. *G02F 1/133528* (2013.01); *G02F 1/133502* (2013.01); *G02F 1/133562* (2021.01)

(58) Field of Classification Search
None
See application file for complete search history.

(56) References Cited

U.S. PATENT DOCUMENTS 7,139,125 B1 * 11/2006 Mi .................. G02B 6/0056
                                                  359/833
10,268,063 B2    4/2019 Ju et al.
(Continued)

FOREIGN PATENT DOCUMENTS

JP    H0915426 A    1/1997
JP    2009109969 A   5/2009
(Continued)

OTHER PUBLICATIONS

International Search Report for PCT/KR2020/001015 dated Apr. 29, 2020; 3 pages.
(Continued)

*Primary Examiner* — Phu Vu
(74) *Attorney, Agent, or Firm* — Lerner, David, Littenberg, Krumholz & Mentlik, LLP

(57) ABSTRACT

The present specification relates to a film for compensating for a viewing angle, which comprises a base substrate; a pattern layer; and an optical layer, and in which the pattern layer has a first surface comprising a flat surface and a second surface facing the first surface, and the second surface comprises a plurality of protrusions comprising a curved surface, thereby improving a contrast ratio and a viewing angle and decreasing a color band phenomenon, and a polarizing plate comprising the same, and a display device comprising the same.

7 Claims, 5 Drawing Sheets

(56) References Cited

U.S. PATENT DOCUMENTS

| | | |
|---|---|---|
| 10,775,539 B2 | 9/2020 | Lee et al. |
| 2001/0004275 A1 | 6/2001 | Umemoto et al. |
| 2003/0048400 A1 | 3/2003 | Kim et al. |
| 2005/0094295 A1 | 5/2005 | Yamashita et al. |
| 2005/0099822 A1 | 5/2005 | Choi et al. |
| 2006/0245060 A1 | 11/2006 | Goto |
| 2006/0250707 A1 | 11/2006 | Whitney et al. |
| 2008/0002105 A1 | 1/2008 | Park et al. |
| 2008/0042926 A1* | 2/2008 | Egi .................. H01L 51/5281 345/32 |
| 2012/0087012 A1* | 4/2012 | Imaoku ................ G02B 1/118 359/601 |
| 2016/0187682 A1* | 6/2016 | Oh ...................... G02B 5/045 349/96 |
| 2016/0252665 A1* | 9/2016 | Lee ...................... G02B 5/305 359/489.07 |
| 2017/0052287 A1 | 2/2017 | Lee et al. |
| 2018/0045876 A1* | 2/2018 | Lee ...................... G02B 6/0053 |
| 2018/0329207 A1 | 11/2018 | Sitter et al. |
| 2019/0163023 A1* | 5/2019 | Park ................... G02F 1/133617 |

FOREIGN PATENT DOCUMENTS

| | | | |
|---|---|---|---|
| JP | 2009157405 A | 7/2009 |
| JP | 2009288799 A | 12/2009 |
| JP | 2016126033 A | 7/2016 |
| JP | 2016126350 A | 7/2016 |
| JP | 2016161943 A | 9/2016 |
| JP | 2019501416 A | 1/2019 |
| KR | 20010062553 A | 7/2001 |
| KR | 20030020786 A | 3/2003 |
| KR | 20080000987 A | 1/2008 |
| KR | 20080093805 A | 10/2008 |
| KR | 20110005458 A | 1/2011 |
| KR | 101210985 B1 | 12/2012 |
| KR | 101287208 B1 | 7/2013 |
| KR | 20160077564 A | 7/2016 |
| KR | 20170021421 A | 2/2017 |
| KR | 20170057087 A | 5/2017 |
| KR | 20180029156 A | 3/2018 |

OTHER PUBLICATIONS

Extended European Search Report for Application No. 20748509.5 dated Sep. 3, 2021, 3 Pages.

Lee H. et al., "Separation of multiple images via directional guidance using structured prism and pyramid arrays," Optics Express, Aug. 2016, pp. 20956-20962, vol. 24, No. 18, Optical Society of America. XP055834878.

* cited by examiner

[Figure 1]
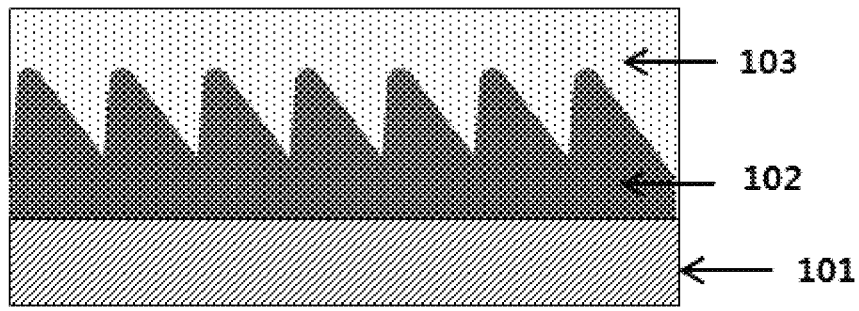
[Figure 2]
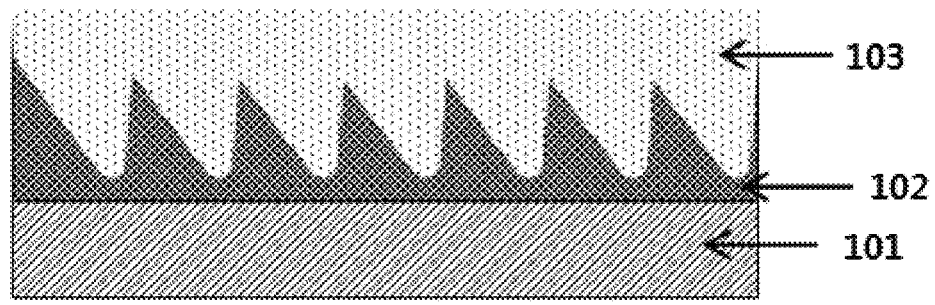
[Figure 3]
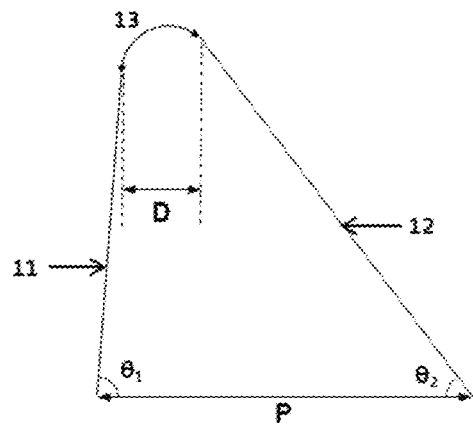

[Figure 4]
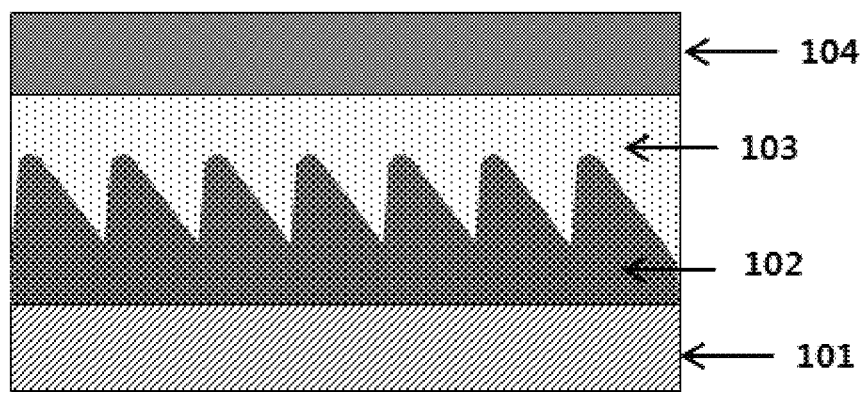
[Figure 5]
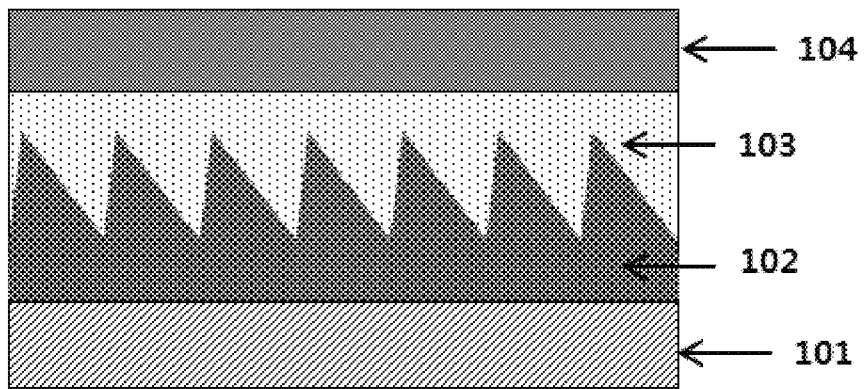

[Figure 6]
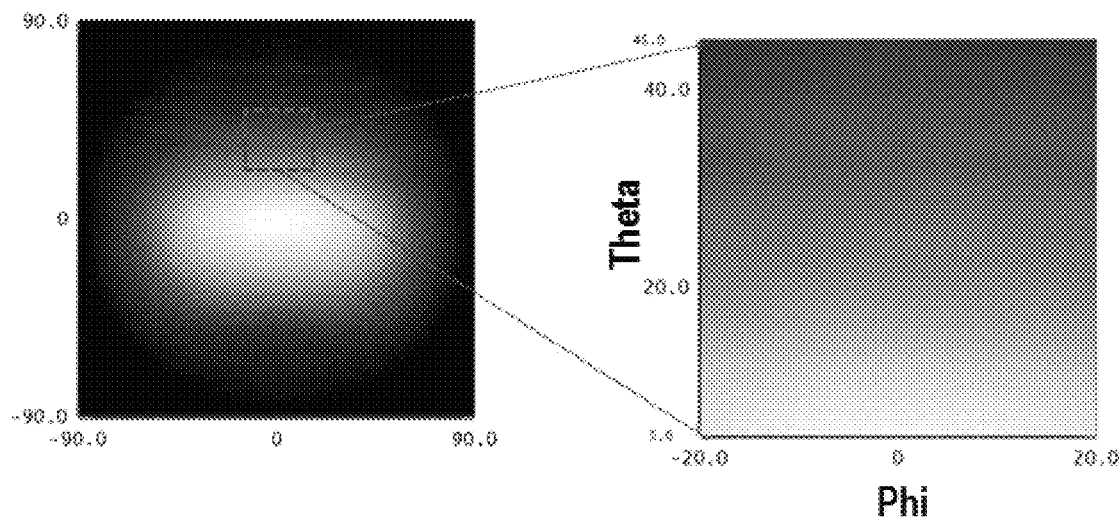
[Figure 7]
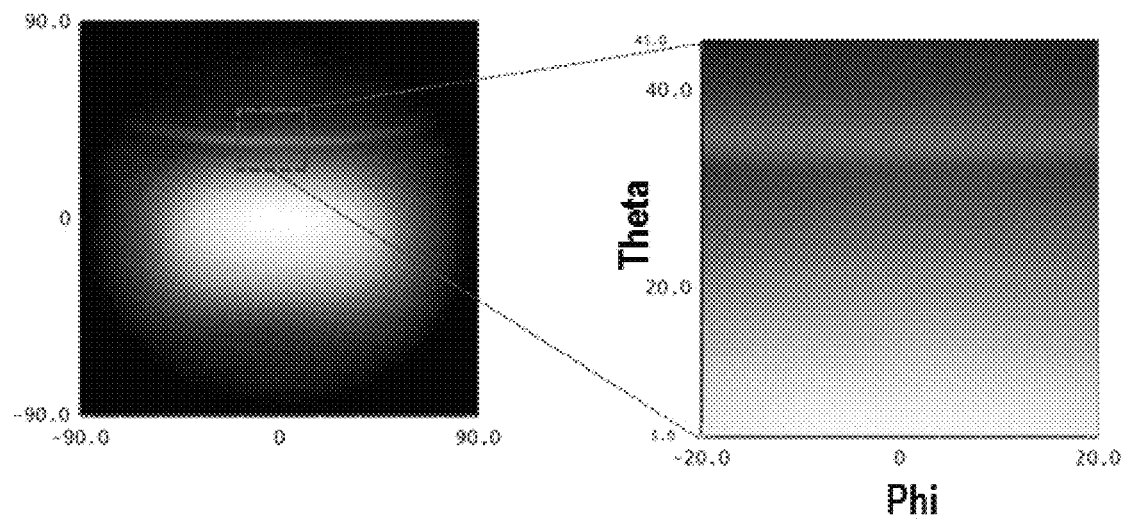

[Figure 8]
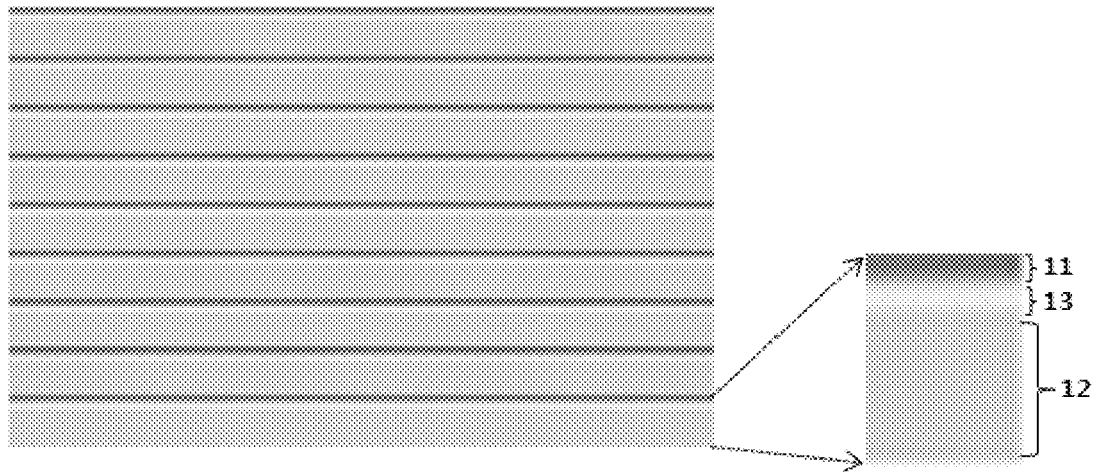
[Figure 9]
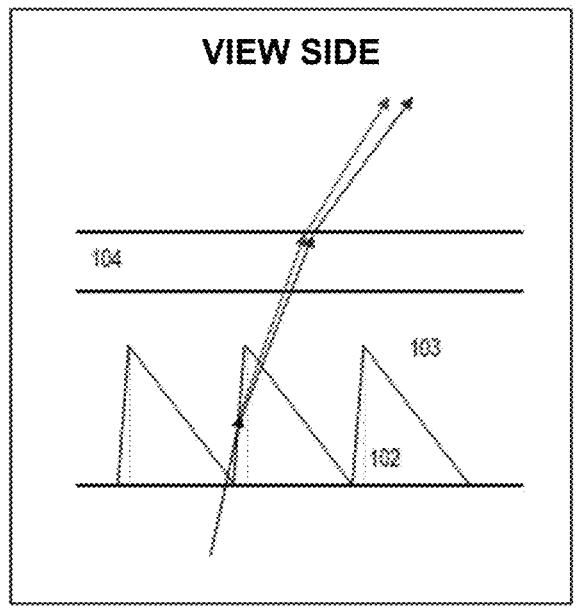

[Figure 10]
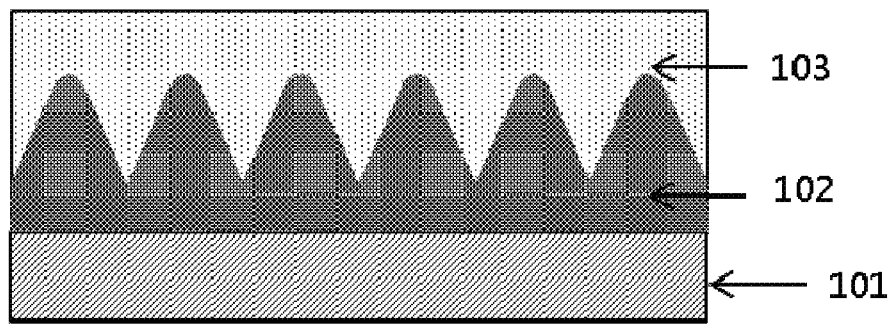
[Figure 11]
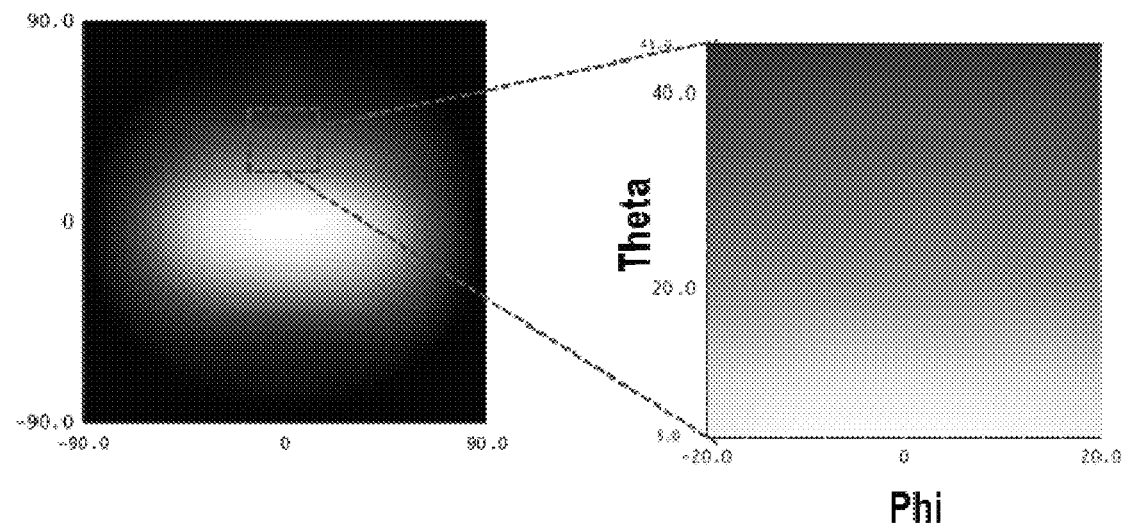

VIEWING ANGLE COMPENSATION FILM, POLARIZING PLATE INCLUDING SAME, AND DISPLAY DEVICE INCLUDING SAME

CROSS-REFERENCE TO RELATED APPLICATIONS

The present application is a national phase entry under 35 U.S.C. § 371 of International Application No. PCT/KR2020/001015, filed on Jan. 21, 2020, which claims priority from Korean Patent Application Nos. 10-2019-0011188 and 10-2020-0007106, filed on Jan. 29, 2019 and Jan. 20, 2020, respectively, the entire contents of which are incorporated by reference herein.

TECHNICAL FIELD

The present specification relates to a film for compensating for a viewing angle, a polarizing plate comprising the same, and a display device comprising the same.

BACKGROUND ART

A liquid crystal display device has been widely used in mobile phones or small portable electronic devices, and in large electronic devices, such as personal computers and televisions, and a flat panel display is one of the use of the liquid crystal display device that is gradually expanded.

As the use of the display device is expanded, a place where the display device is placed and a location thereof are diversified, but there is a problem in that a flat panel display cannot obtain a clear image when viewed from a direction other than the front of the display. Particularly, in the case of a display for a vehicle, a location of the display and the driver's eyes are not parallel, so that there is a problem in that a clear image cannot be obtained from the driver's field of view.

Accordingly, in order to solve the problem, the development of a display device which is capable of improving a viewing angle and a contrast ratio is required.

DISCLOSURE

Technical Problem

The present specification provides a film for compensating for a viewing angle, a polarizing plate comprising the same, and a display device comprising the same.

Technical Solution

An exemplary embodiment of the present specification provides a film for compensating for a viewing angle, comprising: a base substrate; a pattern layer provided on the base substrate; and an optical layer provided on the pattern layer, in which the pattern layer has a first surface comprising a flat surface and a second surface facing the first surface, the second surface comprises a plurality of protrusions comprising a curved surface, the second surface further has a first plane surface and a second plane surface, and an angle $\theta_1$ formed between the first plane surface or a surface extended from the first plane surface and the first surface and an angle $\theta_2$ formed between the second plane surface or a surface extended from the second plane surface and the first surface are different.

Another exemplary embodiment of the present specification provides a polarizing plate comprising the film for compensating the viewing angle.

Another exemplary embodiment of the present specification provides a display device for displaying an image, comprising: a liquid crystal cell; a first polarizing plate provided at a view side of the liquid crystal cell; a second polarizing plate provided at an opposite side of the view side of the liquid crystal cell; and a backlight unit provided at an opposite side of a surface facing the liquid crystal cell of the second polarizing plate, in which the first polarizing plate or the second polarizing plate comprises the film for compensating for the viewing angle.

Advantageous Effects

Accordingly, the film for compensating for the viewing angle according to the exemplary embodiment of the present application may obtain the effects of improving a contrast ratio and a viewing angle in a view of a driver when being applied to a display device for displaying an image, particularly, a display for a vehicle, and adopts the curved surface in the protrusion, thereby decreasing a color separation phenomenon generated due to a difference in a refractive index according to a wavelength of light passing through the film for compensating for the viewing angle.

DESCRIPTION OF DRAWINGS

FIGS. 1 and 2 are diagrams illustrating films for compensating for viewing angles according to exemplary embodiments of the present application, respectively.

FIG. 3 is a diagram illustrating a cross-section of one protrusion comprised in a pattern layer.

FIG. 4 is a diagram illustrating a structure of Example 1.

FIG. 5 is a diagram illustrating a structure of Comparative Example 1.

FIG. 6 is a diagram illustrating a measurement graph of Example 1.

FIG. 7 is a diagram illustrating a measurement graph of Comparative Example 1.

FIG. 8 is a diagram illustrating the pattern layer of the film for compensating for the viewing angle viewed from the top according to the exemplary embodiment of the present application.

FIG. 9 is a diagram illustrating a path of light passing through the film for compensating for the viewing angle comprising the pattern layer that does not have a curved surface.

FIG. 10 is a diagram illustrating a structure of Comparative Example 2.

FIG. 11 is a diagram illustrating a measurement graph of Example 2.

EXPLANATION OF REFERENCE NUMERALS AND SYMBOLS

101: Base substrate
102: Pattern layer
103: Optical layer
104: Polarizing plate
11: First straight line
12: Second straight line
13: Curved surface

BEST MODE FOR CARRYING OUT THE INVENTION

Hereinafter, exemplary embodiments of the present application will be described. However, the exemplary embodiment of the present application may be modified in other various forms, and the scope of the present application is not limited to the exemplary embodiment described below. Further, the exemplary embodiment of the present application is provided for explaining the present application to those having average knowledge in the art in more detail.

A film for compensating for a viewing angle according to an exemplary embodiment of the present application comprises: a base substrate; a pattern layer provided on the base substrate; and an optical layer provided on the pattern layer, in which the pattern layer comprises a first surface comprising a flat surface and a second surface facing the first surface, the second surface comprises a plurality of protrusions comprising curved surfaces, the second surface further comprises a first plane surface and a second plane surface, and an angle $\theta_1$ formed between the first plane surface or a surface extended from the first plane surface and the first surface and an angle $\theta_2$ formed between the second plane surface or a surface extended from the second plane surface and the first surface are different.

According to the exemplary embodiment of the present application, in the case where a display device for displaying an image comprising the film for compensating for the viewing angle is applied as a display for a vehicle, the viewing angle is improved at the view side of a driver, a Contrast Ratio (C/R) is improved, and a color band phenomenon is decreased, so that the driver may obtain a clear image.

The color band phenomenon refers to a phenomenon in which colors are separated by refraction at different angles due to refractive index differences according to wavelengths of light, and when the color band phenomenon occurs, a clear image cannot be obtained.

In the present application, the "curved surface" means a surface formed with a curve, and particularly, the curved surface in the present application may mean a part of a curved surface of a cylinder, like a curved surface 13 illustrated in FIG. 3.

In the present application, a "center of curvature" means the center of a circle when at a predetermined location on a curved surface or a curve, drawing an imaginary circle that is curved to the same extent as a curve passing through the location.

In the present application, the term of "view side" refers to a surface or a direction disposed so that a polarizing plate faces a viewer when mounted on a display device.

In the present application, "extension" refers to elongating while maintaining an inclination of a straight line or a plane surface.

According to the exemplary embodiment of the present application, the plurality of protrusions comprising the curved surfaces is continuously disposed. When the plurality of protrusions comprising the curved surfaces is continuously disposed, a first plane surface of one protrusion is formed to be in contact with a second plane surface of another protrusion. In this case, a portion in which the first plane surface is in contact with the second plane surface may be or may not be in contact with a first surface.

According to another exemplary embodiment of the present application, the plurality of protrusions comprising the curved surfaces is not continuously disposed. When the plurality of protrusions comprising the curved surfaces is not continuously disposed, an additional protrusion may be or may not be comprised between the protrusions.

In the exemplary embodiment of the present application, the second surface further comprises a first plane surface and a second plane surface, and an angle $\theta_1$ formed between the first plane surface or a surface extended from the first plane surface and the first surface and an angle $\theta_2$ formed between the second plane surface or a surface extended from the second plane surface and the first surface are different. $\theta_1$ and $\theta_2$ have different values, so that a viewing angle and a C/R are improved by adjusting a refractive angle of light incident to the pattern layer.

In this case, $\theta_1$ may be 80° to 90°, and 85° to 90°. Further, $\theta_2$ may be 30° to 70°, and 40° to 60°. When $\theta_1$ and $\theta_2$ do not belong to the angle ranges, the effect of improving a viewing angle and a C/R may be degraded.

The "plane surface" means a surface inclined more than 0° and less than 90° or vertical based on the first surface comprising a horizontal surface or the flat surface.

The "flat surface" means that the center line average roughness Ra is less than 0.1 µm.

In the exemplary embodiment of the present application, an angle $\theta$ between the first plane surface or the surface extended from the first plane surface and the second plane surface or the surface extended from the second plane surface may be 20° to 60°, and 40° to 50°. When the angle $\theta$ between the first plane surface or the surface extended from the first plane surface and the second plane surface or the surface extended from the second plane surface satisfies the foregoing range, it is possible to adjust a viewing angle of a display device by adjusting a refractive angle so that light incident on the film for compensating for the viewing angle forms a condensed form, thereby obtaining the effect of improving a C/R.

According to the exemplary embodiment of the present application, at least one cross-section that is vertical to the first surface comprises a curve.

Further, at least one cross-section that is vertical to the first surface comprises a curve together with a first straight line and a second straight line. The cross-section comprising the first straight line, the second straight line, and the curve may be the cross-section of one protrusion, and the curve is located between the first straight line and the second straight line. Particularly, the curve is formed so that an end portion of the first straight line and an end portion of the second straight line are connected. FIG. 3 illustrates the cross-section of one protrusion comprised in the pattern layer, and the cross-section comprises a first straight line 11 comprised in the first plane surface, a second straight line 12 comprised in the second plane surface, a curve 13 that is a part of the curved surface, and the first surface.

In the exemplary embodiment of the present application, at least one cross-section that is vertical to the first surface comprises a first straight line, a second straight line, and a curve, and the curve is formed so that an end portion of the first straight line and an end portion of the second straight line are connected, and the cross-section satisfies Equation 1 below. In this case, a color band may be weakened by adjusting a refractive angle of light in the range that may cause the color band in the light incident on the film for compensating for the viewing angle of the present application.

$$0.1P < D < 0.4P \qquad \text{[Equation 1]}$$

In Equation 1, P means a distance between a point at which the first straight line or a line extended from the first straight line is in contact with the first surface and a point at which the second straight line or a line extended from the second straight line is in contact with the first surface, and D means a distance between a point at which a normal line drawn on the first surface from one end of the curve is in contact with the first surface and a point at which a normal line drawn on the first surface from the other end of the curve is in contact with the first surface.

According to the exemplary embodiment of the present application, P may be 5 μm to 100 μm, and D may be 0.5 μm to 40 μm.

In FIG. 3, P and D are illustrated.

In the exemplary embodiment of the present application, all of the center of curvatures of the curves contained in the protrusions are comprised in the pattern layer or the optical layer.

In the exemplary embodiment of the present application, the curved surface may have a radius R of curvature of 0.5 D to 5 D, and may have a radius R of curvature of 0.5 D to 2 D. In this case, D is the same as the definition in Equation 1. When the radius of curvature of the curved surface is satisfied, it is possible to improve a C/R of the film for compensating for the viewing angle, suppress a color separation phenomenon, and simultaneously improve a viewing angle.

FIGS. 1 and 2 illustrate the films for compensating for the viewing angles according to the exemplary embodiments of the present application, respectively.

In each of FIGS. 1 and 2, a base substrate 101, a pattern layer 102, and an optical layer 103 are sequentially stacked, and FIG. 1 illustrates the film for compensating for the viewing angle in which all of the center of curvatures of the curved surfaces are comprised in the pattern layer 102, and FIG. 2 illustrates the film for compensating for the viewing angle in which all of the center of curvatures of the curved surfaces are contained in the optical layer 103.

FIG. 8 is a diagram illustrating the pattern layer of the film for compensating for the viewing angle viewed from the top according to the exemplary embodiment of the present application, and comprises the first straight line 11, the curve 13, and the second straight line 12.

According to the exemplary embodiment of the present application, a refractive index n1 of the layer comprising the center of curvature between the optical layer and the pattern layer has a larger value than that of a refractive index n2 of the layer comprising no center of curvature. Particularly, when all of the centers of curvature of the curved surface are contained in the pattern layer as illustrated in FIG. 1, a refractive index of the pattern layer is larger than a refractive index of the optical layer, and when all of the centers of curvature of the curved surface are contained in the optical layer as illustrated in FIG. 2, a refractive index of the optical layer is larger than a refractive index of the pattern layer.

n1 may have a value of about 1.4 to 1.75, n2 may have a value of about 1.38 to 1.55, and the range of (n1-n2) value may be 0.02 to 0.3, preferably, 0.03 to 0.2.

A material of the pattern layer may be an ultraviolet curable resin, but is not limited thereto. Examples of the ultraviolet curable resin may comprise epoxy(meth)acrylate, urethane(meth)acrylate, phenylphenol ethoxylated(meth)acrylate, trimethylolpropane ethoxylated (meth)acrylate, phenoxybenzyl(meth)acrylate, phenylphenoxyethyl(meth)acrylate, ethoxylated thiodiphenyldi(meth)acrylate, and phenylthioethyl(meth)acrylate monomers or oligomers thereof, or a fluorene derivative unsaturated resin, but the ultraviolet curable resin is not limited thereto.

A material of the optical layer may be formed by using an ultraviolet curable resin or an acrylate-based adhesive.

A thickness of the optical layer may be about 1 μm to 200 μm.

The film for compensating for the viewing angle according to the exemplary embodiment of the present application may further comprise an additional layer. The additional layer may be an Anti-Glare (AG) layer, a Hard Coating (HC) layer, a Low Refractive (LR) layer, an Anti-Glare & Low-Reflection (AGLR) layer, an Anti-Reflective (AR) layer, and the like, but is not limited thereto.

The hard coating layer, the Anti-Glare (AG) layer, the Low Refractive (LR) layer, the Anti-Glare & Low-Reflection (AGLR) layer, the Anti-Reflective (AR) layer may be formed of a material of a general-purpose primer layer and a thickness of the hard coating layer, the Anti-Glare (AG) layer, the Low Refractive (LR) layer, the Anti-Glare & Low-Reflection (AGLR) layer, or the Anti-Reflective (AR) layer may be 1 μm to 100 μm.

In the exemplary embodiment of the present application, the base substrate may be polyester, polyacryl, polyvinyl chloride, polycarbonate, polymethylmethacrylate, polystylene, polyestersulfone, polybutadiene, triacetate cellulose film (TAC), cycloolefin polymer (COP), polyethylene terephthalate (PET), an acrylate-based film, and the like, but is not limited thereto.

The acrylate-based film may comprise a (meth)acrylate-based resin, and the film comprising the (meth)acrylate-based resin may be obtained by molding a molding material containing a (meth)acrylate-based resin as a main component by extrusion molding.

The acrylate-based film may be the film comprising a copolymer containing an alkyl(meth)acrylate-based unit and a styrene-based unit and an aromatic resin having a carbonate moiety in a main chain, or the film comprising an alkyl(meth)acrylate-based unit, a styrene unit, a 3 to 6 element heterocyclic unit substituted with at least one carbonyl group, and a vinyl cyanide unit. Further, the acrylate-based film may be an acrylate-based resin having a lactone structure.

The (meth)acrylate-based resin having an aromatic ring may comprise a resin composition containing: (a) a (meth)acrylate-based unit containing one or more types of (meth)acrylate derivatives; (b) an aromatic unit having a chain having an hydroxyl group containing portion and an aromatic moiety; and (c) a styrene unit containing one or more styrene-based derivatives. Each of the units (a) to (c) may also be comprised in a resin composition in the form of a copolymer, and two or more units among the units (a) to (c) may also be comprised in a resin composition in the form of one copolymer.

A method of manufacturing the (meth)acrylate-based resin film is not particularly limited, and for example, the (meth)acrylate-based resin film may be manufactured by preparing a thermoplastic resin composition by sufficiently mixing a (meth)acrylate-based resin and other polymers and additives by an appropriate mixing method and then molding the thermoplastic resin composition into a film, or forming a uniform mixed liquid by preparing a (meth)acrylate-based resin and other polymers and additives as separate solutions and then mixing the solutions and then molding the mixed liquid into a film.

The thermoplastic resin composition may be prepared by, for example, extruding and kneading a mixture obtained after preblending the film raw material with a predetermined appropriate mixer, such as an omni mixer. In this case, the mixer used in the extruding and kneading is not particularly limited, and for example, an extruder, such as a single screw extruder and a twin screw extruder, or a predetermined appropriate mixer, such as a pressure kneader, may be used.

The film molding method may be a predetermined appropriate film molding method, such as a solution casting method, a melt extrusion method, a calendar method, and a compression molding method, but is not limited thereto, and the solution casting method and the melt extrusion method are preferable.

A solvent used in the solution casting method may be, for example, aromatic hydrocarbons, such as benzene, toluene, and xylene; aliphatic hydrocarbons, such as cyclohexane and decalin; esters, such as ethyl acetate and butyl acetate; ketones, such as acetone, methylethyl ketone, and methyl isobutyl ketone; alcohols, such as methanol, ethanol, isopropanol, butanol, isobutanol, methyl cellosolve, ethyl cellosolve, and butyl cellosolve; ethers, such as tetrahydrofuran and dioxane; halogenated hydrocarbons, such as dichloromethane, chloroform, and carbon tetrachloride; dimethylformamide; and dimethyl sulfoxide, and the solvents may be used solely or two or more solvents may be used together.

A device for performing the solution casting method may be, for example, a drum-type casting machine, a band-type casting machine, and a spin coater. The melt extruding method may be, for example, a T die method and an inflation method. A molding temperature may be, particularly, 150° C. to 350° C., and more particularly, 200° C. to 300° C., but is not limited thereto.

In the case where the film is molded by the T die method, a roll-shape film may be obtained by mounting a T-die on a tip portion of the published single screw extruder or twin screw extruder and winding a film extruded in a film shape. In this case, the film may also be uniaxially stretched by appropriately adjusting a temperature of a winding roll and stretching in an extrusion direction. Further, simultaneous biaxial stretching, sequential biaxial stretching, and the like may also be performed by stretching the film in a direction that is vertical to the extrusion direction.

The acrylate-based film may be any one of a non-oriented film or an oriented film. The oriented film may be a uniaxial stretching film or a biaxial stretching film, and the biaxial stretching film may be any one between a simultaneous biaxial stretching film and a sequential biaxial stretching film. When the film is biaxially stretched, mechanical strength is improved, so that film performance is improved. By mixing another thermoplastic resin, even when the acrylate-based film is stretched, a phase difference may be suppressed from increasing and optical isotropy may be maintained.

A stretching temperature may be a range near a glass transition temperature of a thermoplastic resin composition that is a raw material of the film, and preferably, within a range of (glass transition temperature−30° C.) to (glass transition temperature+100° C.), more preferably, within a range of (glass transition temperature−20° C.) to (glass transition temperature+80° C.). When the stretching temperature is lower than (glass transition temperature−30° C.), there is concern in that a sufficient stretching magnification may not be obtained. In contrast to this, when the stretching temperature is higher than (glass transition temperature+100° C.), a flow of the resin composition may arise, so that there is concern in that it is impossible to perform stable stretching.

The stretching ratio defined by an area ratio is preferably 1.1 times to 25 times, and more preferably, 1.3 times to 10 times. When the stretching ratio is less than 1.1 times, there are concerns that toughness accompanying stretching may not be improved. When the stretching ratio is larger than 25 times, there are concerns that the effect according to the increase in the stretching ratio may not be recognized.

A stretching speed is preferably 10%/min to 20,000%/min in one direction, and more preferably, 100%/min to 10,000%/min. When the stretching speed is less than 10%/min, it takes a long time to obtain a sufficient stretching ratio, which may increase the manufacturing cost. When the stretching speed is larger than 20,000%/min, there are concerns that the oriented film may be broken and the like.

In order to stabilize the optical isotropy or a mechanical characteristic of the acrylate-based film, a heat treatment (annealing) and the like may be performed after the stretching treatment. A condition of the heat treatment is not particularly limited, and a predetermined appropriate condition known in the art may be adopted.

According to the exemplary embodiment of the present application, a coating layer, such as the Anti-Glare (AG) layer, the Hard Coating (HC) layer, the Low Refractive (LR) layer, the Anti-Glare & Low-Reflection (AGLR) layer, and the Anti-Reflective (AR) layer, may be formed on at least one surface of the film. In this case, the coating layer may be formed by a method of applying a coating composition on the base film by using a method well known in the art, for example, a bar coating method, a gravure coating method, and a slot die coating method, by using the coating composition for forming the layers and drying the coating composition. In this case, the drying may be performed through a convection oven and the like, but is not limited thereto, and may be performed at a temperature of 100° C. to 120° C. for one second to five seconds. The drying temperature is varied according to a coating stage, and the stretching completed film may be dried in a temperature range that does not exceed the glass transition temperature (Tg) of the film, and the film which is to be stretched is stretched and dried at a stretching temperature at the same time, and is dried in a temperature range that does not exceed a decomposition temperature (Td) of the film.

According to the exemplary embodiment of the present application, the polarizing plate comprising the film for compensating for the viewing angle is provided.

In this case, the polarizing plate comprises a polarizer, and the polarizer is not particularly limited, and a polarizer well known in the art, for example, a film formed of polyvinylalcohol (PVA) containing iodine or dichroic dyes, is used.

The polarizer exhibits a property of extracting only light vibrating in one direction from light incident while vibrating in various directions. The property may be achieved by stretching PVA absorbing iodine with strong tension. For example, more particularly, the polarizer may be formed by a swelling operation in which the PVA film is immersed in an aqueous solution and is swelled, dyeing the swelled PVA film with a dichroic material imparting polarization to the swelled PVA film, a stretching operation in which the dichroic dye material is arranged in parallel in the stretching direction by stretching the dyed PVA film, and a color correcting operation in which a color of the PVA film that passed through the stretching operation is corrected. However, the polarizing plate of the present application is not limited thereto.

Further, the polarizing plate may comprise a general-purpose polarizer protective film on one surface or both surfaces of the polarizer.

The film for compensating for the viewing angle may be provided at the outermost side of the polarizing plate.

In the exemplary embodiment of the present application, when the film for compensating for the viewing angle is laminated to the polarizing plate, a layer having a smaller refractive index between the optical layer and the pattern layer is disposed at the view side. When the film for compensating for the viewing angle is disposed as described above, light passing through the film for compensating for the viewing angle passes through the second straight line and then light passing through the first straight line passes through the curved surface, so that light that is color separated while passing through the first straight line passes through the curved surface and thus is mixed, thereby degrading a color separation phenomenon.

FIG. 9 illustrates a path of light passing through the polarizing plate, to which the film for compensating for the viewing angle comprising the pattern layer that does not have a curved surface is attached, and the color separation is generated while light passing through the second straight line (the second plane surface) of one protrusion passes through the first straight line (the first plane surface) of another protrusion formed to be adjacently formed to one protrusion.

According to an exemplary embodiment of the present application, there is provided a display device for displaying an image comprising: a liquid crystal cell; a first polarizing plate provided at a view side of the liquid crystal cell; a second polarizing plate provided at an opposite side of the view side of the liquid crystal cell; and a backlight unit provided at an opposite side of a surface facing the liquid crystal cell of the second polarizing plate, in which the first polarizing plate or the second polarizing plate comprises the film for compensating for the viewing angle.

In the exemplary embodiment of the present application, the film for compensating for the viewing angle is comprised at the view side of the first polarizing plate for the display device for displaying the image, and a layer having a smaller refractive index between the optical layer and the pattern layer of the film for compensating for the viewing angle is disposed at the view side. The view side of the first polarizing plate means an opposite side of the liquid crystal cell side of the polarizer of the first polarizing plate.

According to another exemplary embodiment of the present application, the film for compensating for the viewing angle is comprised at an opposite side of the view side of the second polarizing plate for the display device for displaying the image, and a layer having a smaller refractive index between the optical layer and the pattern layer of the film for compensating for the viewing angle is disposed at the view side. The opposite side of the view side of the second polarizing plate means an opposite side of the liquid crystal cell side of the polarizer of the second polarizing plate.

According to another exemplary embodiment of the present application, the film for compensating for the viewing angle may be provided at the outermost side of the first polarizing plate or the second polarizing plate.

The first polarizing plate means an upper polarizing plate and the second polarizing plate means a lower polarizing plate.

According to another exemplary embodiment of the present application, the first polarizing plate comprises the film for compensating for the viewing angle, and a layer having a smaller refractive index between the optical layer and the pattern layer of the film for compensating for the viewing angle is disposed at the view side.

As the main viewing angle (maximum brightness angle) of the display device is changed and a light concentration ratio is increased, a C/R at a location that is not parallel to the display device may be improved.

The backlight unit comprises a light source emitting light from a rear surface of a liquid crystal panel, and the kind of light source is not particularly limited, and a light source for a general Liquid Crystal Display (LCD), such as a Cold Cathode Fluorescent Lamp (CCFL), a Hot Cathode Fluorescent Lamp (HCFL), or a Light Emitting Diode (LED), may be used.

[Mode for Carrying Out the Invention]

Hereinafter, an operation and an effect of the present invention will be described in more detail through a particular Example of the present application. However, the Example is simply presented as an example of the invention, and the scope of the present invention is not defined by the Example.

EXAMPLE

Example 1

A simulation was performed by forming a display device comprising a film for compensating for a viewing angle in which a base substrate, a pattern layer, and an optical layer are sequentially stacked, and a structure of the film for compensating for the viewing angle attached to a polarizing plate is illustrated in FIG. 4.

1) Pattern layer: Comprising a plurality of protrusions, in which an angle formed between a first straight line and a first surface is 88°, an angle formed between a second straight line and the first surface is 55°, P is 13.5 μm, and a curved surface has a curvature of 2 μm (refractive index: 1.58, Abbe constant: 25.9)

2) Optical layer: Provided in an upper portion of the pattern layer (refractive index: 1.48, Abbe constant: 51.5)

3) Attach the film for compensating for the viewing angle: The film for compensating for the viewing angle is located at an opposite side (an opposite side of a view side) of a surface facing a liquid crystal cell of a polarizer of a lower polarizing plate, the optical layer faces the polarizer side (the view side), and the pattern layer is disposed so as to face a light source corresponding to a backlight.

Example 2

A film for compensating for a viewing angle was formed by the same method as that of Example 1 except that a curvature of the pattern layer is 4 μm unlike Example 1.

Comparative Example 1

A film for compensating for a viewing angle was formed by the same method as that of Example 1 except that a pattern layer comprising a plurality of protrusions comprising no curved surface is formed, instead of the plurality of protrusions comprising the curved surface unlike Example 1, and a structure of the film for compensating for the viewing angle attached to a polarizing plate is illustrated in FIG. 5.

Comparative Example 2

A simulation was performed by forming a display device comprising a film for compensating for a viewing angle in which a base substrate, a pattern layer, and an optical layer are sequentially stacked, and a structure of the film for compensating for the viewing angle attached to a polarizing plate is illustrated in FIG. 10.

1) Pattern layer: Comprising a plurality of protrusions, in which an angle formed between a first straight line and a first surface is 70°, an angle formed between a second straight line and the first surface is 70°, P is 13.5 μm, and a curved surface has a curvature of 2 μm (refractive index: 1.58, Abbe constant: 25.9)

2) Optical layer: Provided in an upper portion of the pattern layer (refractive index: 1.48, Abbe constant: 51.5)

3) Attach the film for compensating for the viewing angle: The film for compensating for the viewing angle is located at an opposite side (an opposite side of a view side) of a surface facing a liquid crystal cell of a polarizer of a lower polarizing plate, the optical layer faces the polarizer side (the view side), and the pattern layer is disposed so as to face a light source corresponding to a backlight.

Experimental Example 1

The simulation was performed on the structures manufactured in Examples 1 and 2 and Comparative Example 1 by using ZEMAX S/W from the Radiant Solution Company. In this case, the number of rays of the applied light source is 10,000,000, and as a spectrum of the light source, a spectrum of D65 was applied. A color according to an angle was calculated, and the results of the calculation are illustrated in FIG. 6 (Example 1), FIG. 11 (Example 2), and FIG. 7 (Comparative Example 1).

Referring to FIGS. 6, 11, and 7, it can be seen that a color separation phenomenon of incident light is more clearly exhibited in Comparative Example 1, compared to Examples 1 and 2 comprising the film for compensating for the viewing angle of the present application.

Experimental Example 2

For the structures manufactured in Example 1 and Comparative Example 2, a C/R value was calculated by measuring a viewing angle distribution in an on/off state (white/black mode) of a panel by using EZContrast x188 equipment from the Eldim Company. Further, the simulation was performed by forming a display device (Reference Example 1) to which a film for compensating for a viewing angle is not applied as a reference.

A Liquid Crystal Display (LCD) is used in various devices, such as a Television (TV), a monitor, a mobile phone, and a tablet Personal Computer (PC). Performance of the LCD is expressed by using a numerical value of a C/R, which is one of the numerical values representing performance, representing a ratio of white frontal luminance (on state) and black frontal luminance (off state), and as the C/R is large, the LCD is evaluated as an excellent device.

However, according to the development of technology and for convenience for a human, the LCD has begun to be applied to a field that has not been previously applied, and an LCD for a vehicle, such as a vehicle dashboard and a navigation system, are being introduced. In the case of the LCDs for the vehicle, the screens are mostly viewed from the side rather than from the front like the existing LCDs (TVs, mobile phones, and the like). Accordingly, in the present application, in addition to the front C/R representing the performance of the LCD, a numerical value of an Area A C/R which quantifies the performance of the LCD at a viewing angle is introduced. In the present application, the Area A C/R represents a C/R at a viewing angle of 40°.

TABLE 1

| | Area A C/R distribution (%) |
|---|---|
| Reference Example 1 | 100% |
| Example 1 | 113% |
| Comparative Example 2 | 84% |

Referring to the result of Table 1, it can be seen that the Area A C/R is increased in Example 1 which comprises the protrusion having an asymmetric form and the protrusion has the curved surface, compared to Comparative Example 2 which comprises the protrusion having a symmetric form.

Accordingly, the film for compensating for the viewing angle according to the exemplary embodiment of the present application may obtain the effects of improving a contrast ratio and a viewing angle in a view of a driver when being applied to a display device for displaying an image, particularly, a display for a vehicle, and adopts the curved surface in the protrusion, thereby decreasing a color separation phenomenon generated due to a difference in a refractive index according to a wavelength of light passing through the film for compensating for the viewing angle.

The invention claimed is:

1. A polarizing plate, comprising:
a base substrate;
a pattern layer provided on the base substrate;
an optical layer provided on the pattern layer; and
a polarizer provided on the optical layer,
wherein the pattern layer has a first surface comprising a flat surface and a second surface facing the first surface,
the second surface comprises a plurality of protrusions,
wherein each protrusion comprises a first plane surface, a second plane surface, and a curved surface,
wherein each curved surface connects a first plane surface and a second plane surface,
wherein the centers of curvature of the curved surfaces are containing in the pattern layer or in the optical layer,
wherein a refractive index of the layer comprising the centers of curvature has a larger value than a refractive index of the layer which does not comprise the centers of curvature,
wherein the first and second plane surfaces extend along a direction of the polarizing plate, and
wherein an angle $\theta_1$ formed between the first plane surface or a surface extended from the first plane surface and the first surface and an angle $\theta_2$ formed between the second plane surface or a surface extended from the second plane surface and the first surface are different.

2. The polarizing plate of claim 1, wherein the plurality of protrusions are continuously disposed.

3. The polarizing plate of claim 1, wherein each protrusion has a cross-section that is vertical to the first surface and has a curve.

4. The polarizing plate of claim 1, wherein each protrusion has a cross-section that is vertical to the first surface and is formed of a first straight line, a second straight line, and a curve,
the curve is formed by connecting an end of the first straight line and an end of the second straight line, and
the cross-section satisfies Equation 1 below, $$0.1P < D < 0.4P \qquad [\text{Equation 1}]$$

in Equation 1,
P means a distance between a point at which the first straight line or a line extended from the first straight line is in contact with the first surface and a point at which the second straight line or a line extended from the second straight line is in contact with the first surface, and
D means a distance between a point at which a normal line drawn on the first surface from one end of the curve is in contact with the first surface and a point at which a normal line drawn on the first surface from the other end of the curve is in contact with the first surface.

5. A display device for displaying an image, comprising:
a liquid crystal cell;
a first polarizing plate provided at a view side of the liquid crystal cell;
a second polarizing plate provided at an opposite side of the view side of the liquid crystal cell; and
a backlight unit provided at an opposite side of a surface facing the liquid crystal cell of the second polarizing plate,
wherein the first polarizing plate or the second polarizing plate is the polarizing plate of claim 1.

6. The display device of claim 5, wherein the first polarizing plate is the polarizing plate of claim 1, and
a layer having a smaller refractive index between the optical layer and the pattern layer of the film for compensating for the viewing angle is disposed at the view side.

7. The display device of claim 5, wherein the second polarizing plate is the polarizer of claim 1, and
a layer having a smaller refractive index between the optical layer and the pattern layer of the film for compensating for the viewing angle is disposed at the view side.

\* \* \* \* \*